(12) United States Patent
Reczek

(10) Patent No.: US 12,340,342 B2
(45) Date of Patent: Jun. 24, 2025

(54) SYSTEM AND METHOD FOR TRACING A TRANSPORT

(71) Applicant: PITT-OHIO Express, LLC, Pittsburgh, PA (US)

(72) Inventor: Christina Marie Reczek, Carnegia, PA (US)

(73) Assignee: PITT-OHIO Express, LLC, Pittsburgh, PA (US)

( * ) Notice: Subject to any disclaimer, the term of this patent is extended or adjusted under 35 U.S.C. 154(b) by 12 days.

(21) Appl. No.: 17/963,381

(22) Filed: Oct. 11, 2022

(65) Prior Publication Data

US 2024/0119407 A1   Apr. 11, 2024

(51) Int. Cl.
G06Q 50/40     (2024.01)
G06Q 10/0833   (2023.01)
G06Q 10/087    (2023.01)

(52) U.S. Cl.
CPC ....... *G06Q 10/087* (2013.01); *G06Q 10/0833* (2013.01)

(58) Field of Classification Search
CPC ... G06Q 10/087; G06Q 10/0833; G06Q 50/40
USPC ....................................................... 705/333
See application file for complete search history.

(56) References Cited

U.S. PATENT DOCUMENTS

| | | | |
|---|---|---|---|
| 8,903,593 B1 | 12/2014 | Addepalli et al. | |
| 9,739,621 B2 | 8/2017 | Modica et al. | |
| 10,060,752 B2 | 8/2018 | Salowitz | |
| 10,152,882 B2 | 12/2018 | Zhao et al. | |
| 11,113,974 B1 | 9/2021 | Fung | |
| 2019/0347582 A1* | 11/2019 | Allen | G06Q 10/02 |
| 2020/0132479 A1 | 4/2020 | Khasis | |
| 2020/0307610 A1* | 10/2020 | Lerner | G07C 5/008 |
| 2020/0342399 A1* | 10/2020 | Koppinger, III | G06Q 30/018 |
| 2021/0080269 A1 | 3/2021 | Sharma et al. | |
| 2021/0102814 A1 | 4/2021 | Spielman et al. | |
| 2023/0169446 A1* | 6/2023 | Kunjukrishnan | G06Q 10/0833 705/333 |

FOREIGN PATENT DOCUMENTS

| | | | | |
|---|---|---|---|---|
| CN | 103942522 A | * | 7/2014 | |
| EP | 3101600 | | 12/2016 | |
| WO | 2019125277 | | 6/2019 | |
| WO | WO-2022056018 A1 | * | 3/2022 | G06K 19/06037 |
| WO | WO-2023023630 A1 | * | 2/2023 | G06Q 40/08 |

OTHER PUBLICATIONS

Here, Fleet Management, Nov. 15, 2021.

* cited by examiner

*Primary Examiner* — Luna Champagne
(74) *Attorney, Agent, or Firm* — _Caldwell Intellectual Property Law

(57) ABSTRACT

In an aspect a system for tracing a transport. A system includes a computing device. A computing device is configured to identify at least a transport entity of a plurality of transport entities of a transport using a unique identifier of a first node of an immutable sequential listing. A computing device is configured to record a verified unique identifier of at least a transport entity in a first data block of an immutable sequential listing. A computing device is configured to communicate transport data with at least a transport entity through a first node of an immutable sequential listing. A computing device is configured to generate an error mapping of at least a transport entity.

18 Claims, 7 Drawing Sheets

SYSTEM AND METHOD FOR TRACING A TRANSPORT

FIELD OF THE INVENTION

The present invention generally relates to the field of transportation systems and performance tracking. In particular, the present invention is directed to systems and methods for tracing a transport.

BACKGROUND

Modern supply chains have many points in a transportation that need to be completed for a successful transport. However, modern supply chains are inefficient at communicating data and identifying transportation deviance. As such, modern systems and methods for tracing a transport can be improved.

SUMMARY OF THE DISCLOSURE

In one aspect of the disclosure a system for tracing a transport is disclosed. A system includes a computing device. A computing device is configured to identify at least a transport entity of a plurality of transport entities of a transport using a unique identifier of a first node of an immutable sequential listing. A computing device is configured to verify a unique identifier of a first node as a function of a verification criteria of an immutable sequential listing. A computing device is configured to record a verified unique identifier of at least a transport entity in a first data block of an immutable sequential listing. A computing device is configured to communicate transport data with at least a transport entity through a first node of an immutable sequential listing. A computing device is configured to verify transport data of a first node as a function of a verification criteria of an immutable sequential listing. A computing device is configured to record at least a transport datum of verified transport data in a second data block of an immutable sequential listing. A computing device is configured to compare a first data block and a second data block of an immutable sequential listing to a transport parameter threshold. A computing device is configured to generate an error mapping of at least a transport entity.

In another aspect a method of tracing a transport using a computing device is disclosed. A method includes identifying at least a transport entity of a plurality of transport entities of a transport using a unique identifier of a first node of an immutable sequential listing. A method includes verifying a unique identifier of a first node as a function of a verification criteria of an immutable sequential listing. A method includes recording a verified unique identifier of at least a transport entity in a first data block of an immutable sequential listing. A method include communicating transport data with at least a transport entity though a first node of an immutable sequential listing. A method includes verifying transport data of a first node as a function of a verification criteria of an immutable sequential listing. A method includes recording at least a transport datum of verified transport data in a second data block of an immutable sequential listing. A method includes comparing a first data block and a second data block of an immutable sequential listing to a transport parameter threshold. A method includes generating as a function of a comparison an error mapping of at least a transport entity.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
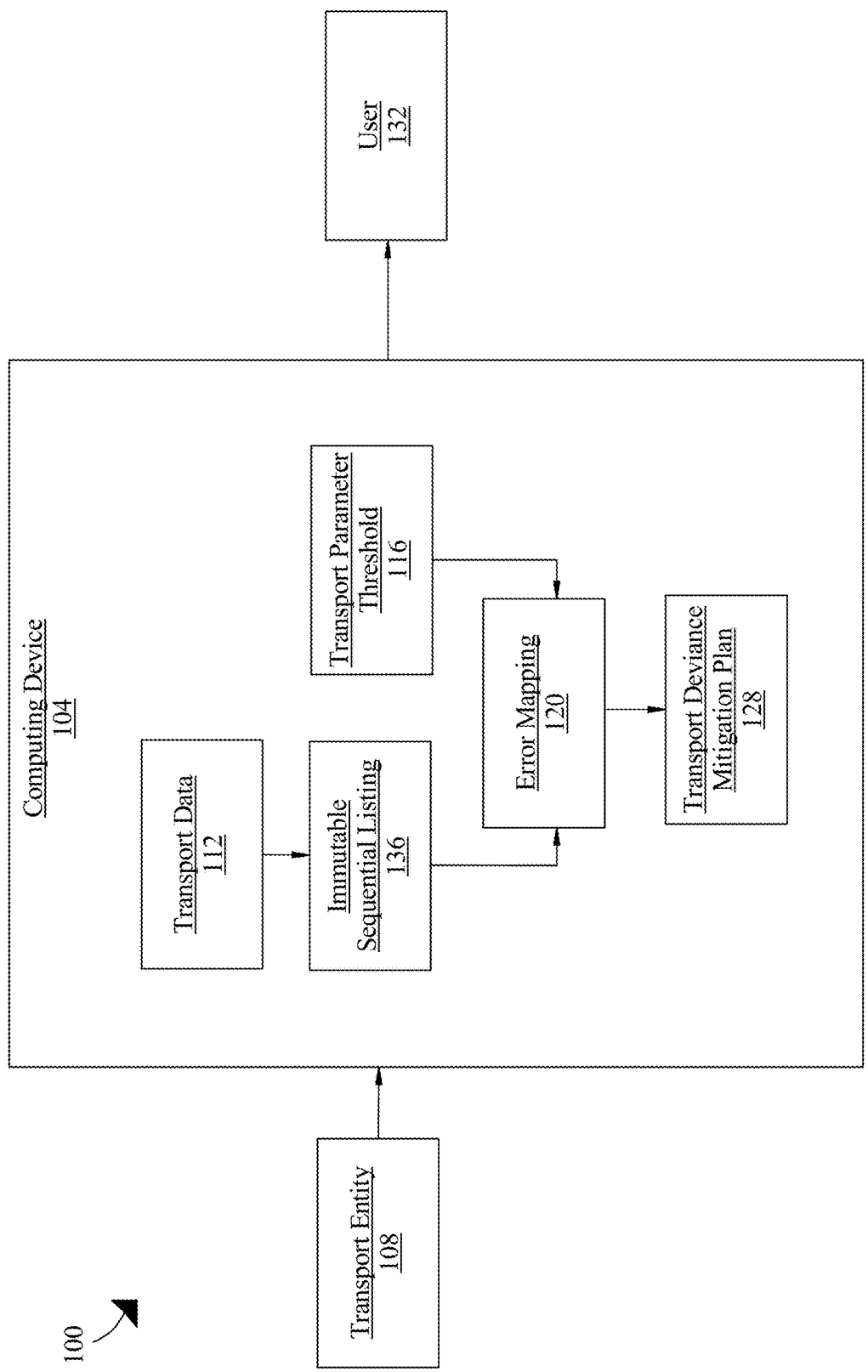
FIG. 1 is an exemplary embodiment of a system for transport deviance mitigation.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Described herein is a system for tracing a transport. A system may include a computing device. A computing device may be configured to identify at least a transport entity of a plurality of transport entities of a transport using a unique identifier of a first node of an immutable sequential listing. A computing device may be configured to verify a unique identifier of a first node as a function of a verification criteria of an immutable sequential listing. A computing device may be configured to record a verified unique identifier of at least a transport entity in a first data block of an immutable sequential listing. A computing device may be configured to communicate transport data with at least a transport entity through a first node of an immutable sequential listing. A computing device may be configured to verify transport data of a first node as a function of a verification criteria of an immutable sequential listing. A computing device may be configured to record at least a transport datum of verified transport data in a second data block of an immutable sequential listing. A computing device may be configured to compare a first data block and a second data block of an immutable sequential listing to a transport parameter threshold. A computing device may be configured to generate an error mapping of at least a transport entity.

Described herein is a method of tracing a transport using a computing device. A method may include identifying at least a transport entity of a plurality of transport entities of a transport using a unique identifier of a first node of an immutable sequential listing. A method may include verifying a unique identifier of a first node as a function of a verification criteria of an immutable sequential listing. A method may include recording a verified unique identifier of at least a transport entity in a first data block of an immutable sequential listing. A method may include communicating transport data with at least a transport entity though a first node of an immutable sequential listing. A method may include verifying transport data of a first node as a function of a verification criteria of an immutable sequential listing. A method may include recording at least a transport datum of verified transport data in a second data block of an immutable sequential listing. A method may include comparing a first data block and a second data block of an immutable sequential listing to a transport parameter threshold. A method may include generating as a function of a comparison an error mapping of at least a transport entity.

Aspects of the present invention may be used to improve transparency between a plurality of transport entities engaging in a transport. In an embodiment, by verifying and recording data pertaining to each action of a transport in an immutable sequential listing, one or more transports may be easily tracked since the immutable sequential listing cannot be changed. Errors such as, but not limited to, duplicate transactions, transport entity false verification, transport component false verification, and the like may be reduced through the use of an immutable sequential listing. In addition, aspects of the present invention may allow for an improved performance and/or error mapping of a plurality of transport entities. By recording actions of transport entities of a transport in an immutable sequential listing, each action of each transport entity may be validated and/or verified which may allow for a transparent performance tracking.

Referring now to FIG. 1, an exemplary embodiment of a system 100 for transport deviance mitigation is illustrated. System 100 may include computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of system 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, computing device 104 may be configured to communicate with transport entity 108. A "transport entity" as used in this disclosure is any individual or machine capable of transporting one or more components and/or objects. In some embodiments, transport entity 108 may include a carrier. A carrier may include a transport vehicle, such as, but not limited to, a truck, car, motorcycle, boat, ship, drone, helicopter, plane, and the like. In some embodiments, there may be a group of transport entities. In some embodiments, transport entity 108 may include a carrier type. A carrier type may include, but is not limited to, a terrestrial carrier, an aerial carrier, and/or an aquatic carrier, or any combination thereof. In some embodiments, a carrier type may include but is not limited to, a plane, a drone, a helicopter, a boat, a ship, a car, a truck, a motorcycle, and the like. In some embodiments, a carrier type may include a motorized carrier. In other embodiments, a carrier type may include a non-motorized carrier. In some embodiments, a non-motorized carrier may include, but is not limited to, a bicycle, a skateboard, a scooter, and the like. In some embodiments, computing device 104 may be configured to directly communicate with transport entity 108 through a cellular, GPS, and/or Wi-Fi connection. In some embodiments, computing device 104 may be configured to communicate with a computing device of transport entity 108, such as, but not limited to, a smartphone, laptop, tablet, and the like.

Still referring to FIG. 1, computing device 104 may record at least a transport datum of transport data 112 in immutable sequential listing 136. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. Immutable sequential listing 136 may be, include and/or implement an immutable ledger, where data entries that have been posted to the immutable sequential listing cannot be altered. Immutable sequential listing 136 may be further described below with reference to FIG. 3.

Still referring to FIG. 1, in some embodiments, computing device 104 may be configured to identify transport entity 108 from a group of entities. Identification may include, but is not limited to, receiving a unique identifier from a first node of immutable sequential listing 136. A "first node" as used in this disclosure is a computing device in communication with an immutable sequential listing. A first node may include, but is not limited to, a smartphone, laptop, server, desktop, tablet, and the like. A first node may include a computing device of transport entity 108. A "unique identifier" as used in this disclosure is an arrangement of data that identifies an object. A unique identifier may include a unique identification signal. A unique identification signal may include a passive identification such as but not limited to a quick response (QR) code. A "QR" code as used in this disclosure is a type of matrix barcode with a machine-readable optical label that contains information about the item to which it is attached. A QR code may include black squares arranged in a square grid on a white background which may be read by an imaging device. A QR code may be configured to be processed using Reed-Solomon error correction. In other embodiments, a unique identification signal may be generated from a radio frequency identification (RFID) tag. An RFID tag may be configured to utilize electromagnetic fields to automatically identify and track transport entity 108. In some embodiments, an RFID tag may include a radio transponder, radio receiver, and/or radio transmitter. In some embodiments, an RFID tag may include a passive system. A passive RFID tag may include an RFID tag that may be powered by energy from an RFID reader's electromagnetic waves. In other embodiments, an RFID tag may be actively powered by a power source such as a battery. In other embodiments, a unique identification signal may be generated from a near field communication (NFC) tag. An NFC tag may include an antenna that may be configured to inductively couple with another antenna. Inductive coupling may include a configuration in which a change in current through one conductor wire induces a voltage across another conductive wire and vice versa. In some embodiments, an NFC tag may be configured to communicate data between two electronic components within a distance of about 4 cm or less. In some embodiments, an NFC tag may be configured to communicate data between two electronic components over a distance of greater than about 4 cm. In some embodiments, an NFC tag may include a plurality of modes, such as but not limited to, card emulation, reader/write, and/or peer-to peer modes. In other embodiments, a unique identification signal may include a unique identification number (UID). A UID may be configured to prevent any duplicate identity records of an entity. In some embodiments, a unique identification signal may include a digital object identifier (DOI). A DOI may include a persistent identifier and/or handle used to identify objects uniquely, standardized by the International Organization for Standardization. In some embodiments, a unique identification signal may utilize a hash function. As a non-limiting example, an identification signal may be sent through a hash function, such as, but not limited to, SHA-256 or SHA3-256, which may transform the identification signal into a 256-bit output. A hash function may ensure an identification signal cannot be replicated. In some embodiments, a unique identification signal may include a form of security utilizing an immutable sequence listing As a non-limiting example, an identification signal may be verified and stored in a block chain, which may ensure the identification signal cannot be changed.

Still referring to FIG. 1, computing device 104 may be configured to verify a unique identifier of a first node as a function of a verification criteria. As used in this disclosure, "verification" is a process of ensuring that the entity being "verified" complies with certain constraints, for example without limitation system requirements, regulations, legal requirements and the like. Verification may include ensuring that data is complete, for example that all required data types, are present, readable, and/or uncorrupted. In some cases, some or all verification processes may be performed by computing device 104. In some cases, at least a machine-learning process, for example a machine-learning model, may be used to verify. A machine-learning process may be trained on training data correlating identification signals and verification parameters to verified identifiers. Computing device 104 may input an identification signal into a machine-learning process which may output an indication that the identification signal may be a verified identification signal. Computing device 104 may use any machine-learning process described in this disclosure for this or any other function. In some embodiments, at least one of validation and/or verification includes without limitation one or more of supervisory validation, machine-learning processes, graph-based validation, geometry-based validation, and rules-based validation. Verification of data using an immutable sequential listing may be as described below in FIG. 3.

Still referring to FIG. 1, computing device 104 may verify a unique identifier of a first node of immutable sequential listing 136. Verification may include a verification criteria. A "verification criteria" as used in this disclosure is a parameter that if met validates data. Verification criteria may include, but is not limited to, chronological elements, transport data, unique identification signals, locational data, digital signatures, and the like. "Chronological elements" as used in this disclosure is information pertaining to times and/or dates. Computing device 104 may record verified data in immutable sequential listing 136. In some embodiments, computing device 104 may record verified data in the form of adding data blocks to immutable sequential listing 136. A "data block," as used in this disclosure, is a sequence of data having a maximum data structure length. Computing device 104 may record a verified unique identifier of a first node in immutable sequential listing 136.

Still referring to FIG. 1, in some embodiments, computing device 104 may be configured to receive transport data 112 from transport entity 108. "Transport data" as used in this disclosure is any form of information pertaining to a transport. In some embodiments, transport data 112 may include a transport path of transport entity 108. A transport path may include a path a carrier may take in the process of transporting a transport component. A transport path may include, but is not limited to, directions, estimated transport times, detour information, street addresses, and the like. In some embodiments, a transport path may include departure times, arrival times, fueling times, rest times, and the like. In some embodiments, a transport path may include geographical coordinates, altitudes, longitudes, latitudes, and/or other locational datum. In some embodiments, a transport path may include a latitude, longitude, and/or altitude between two or more carriers. In some embodiments, transport data 112 may include a plurality of transport paths of plurality of carriers. In some embodiments, transport data 112 may include a location of transport entity 108. In some embodiments, a location of transport entity 108 may be updated in real time. "Real time" as used in this disclosure is the actual time an action and/or event occurs. In some embodiments, transport data 112 may include data of a transport component. A "transport component" as used in this disclosure is any object that is transported by one or more transport entities. A transport component may include dimensions such as, but not limited to, height, length, width, thickness, volume, weight, and the like. In some embodiments, a transport component may belong to a transport component category. A transport component category may include categories such as, but not limited to, food, construction materials, electronics, consumer goods, vehicles, vehicle parts, furniture, and/or other categories. In some embodiments, a transport component may include a value. In some embodiments, transport data 112 may include an estimated delivery cost of transporting a transport component. An estimated delivery cost may include a cost of transportation of a transport component. In some embodiments, an estimated delivery cost may include a combined cost of a delivery and the cost of transportation of a transport component. In some embodiments, transport data 112 may include a location of a transport component. Transport data 112 may include data showing which transport entity of a plurality of transport entities is in possession of a transport component.

Still referring to FIG. 1, computing device 104 may verify transport data 112 of a first node as a function of a verification criteria of immutable sequential listing 136. Computing device 104 may generate immutable sequential listing 136 with at least a transport datum of transport data 112. In some embodiments, computing device 104 may record a unique identifier of a first node in immutable sequential listing 136. In some embodiments, computing device 104 may record a unique identifier of a first node in a first data block of immutable sequential listing 136. A "first block" as used in this disclosure is a set of verified data of an immutable sequential listing. A first block may include data such as, but not limited, transport entity identification, transport entity location, transport entity time of access, and the like. Computing device 104 may communicate transport data 112 through a first node of immutable sequential listing 136. Computing device 104 may record at least a transport datum of communicated transport data 112 in a second data block of immutable sequential listing 136. A "second data block" as used in this disclosure is a set of data of an immutable sequential listing temporally different from a previous set of data of an immutable sequential listing.

Still referring to FIG. 1, in some embodiments, computing device 104 may generate immutable sequential listing 136 for a category of a transport. As a non-limiting example, computing device 104 may generate a first immutable sequential listing for transactions of a transport, a second immutable sequential listing for locational checkpoints of a transport, and a third immutable sequential listing for a record of actions of a transport entity. In some embodiments, computing device 104 may record all transport data 112 of a transport in a single immutable sequential listing, such as immutable sequential listing 136. As a non-limiting example, immutable sequential listing 136 may record data of a pickup of a transport component by a transport entity in a data block. A data block may include identification of a transport entity, date and time of pickup of a transport component, identification of a transport component, and the like. Computing device 104 may record a plurality of transport data of a plurality of transport entities in immutable sequential listing 136. Computing device 104 may utilize immutable sequential listing 136 to identify transport errors of one or more transport entities. As a non-limiting example, computing device 104 may read one or more blocks of immutable sequential listing 136 that may include transport data 112 of a transport. A block of immutable sequential listing 136 may include data showing that transport entity 108 dropped off an erroneous transport component to a correct address. Computing device 104 may determine transport entity 108 deviated from a transport plan based on data stored in immutable sequential listing 136.

Still referring to FIG. 1, in another embodiment, computing device 104 may record one or more transactions, remittances, and the like in immutable sequential listing 136. Computing device 104 may analyze immutable sequential listing 136 to track and/or monitor costs of a transport. As a non-limiting example, immutable sequential listing 136 may include a record of a transport facility transferring remittance of $1,500 to a transport entity on Nov. 29, 2021 at 11:00 A.M. EST. Immutable sequential listing 136 may include a plurality of transactional records, which may allow for a more precise and/or accurate tracking of costs of a transport. Computing device 104 may analyze data stored in immutable sequential listing 136 to identify one or more erroneous transactions. As a non-limiting example, immutable sequential listing 136 may include a transactional record that may show a transport recipient conveyed a remittance of $350 on Nov. 29, 2021 at 3:40 P.M. EST. and a duplicate remittance of $350 on Nov. 29, 2021 at 3:50 P.M. EST. Computing device 104 may quickly identify a duplicate payment of a transport recipient through immutable sequential listing 136. In some embodiments, computing device 104 may utilize immutable sequential listing 136 to monitor cost thresholds of a transport. As a non-limiting example, computing device 104 may record all financial transactions of a transport in immutable sequential listing 136. Immutable sequential listing 136 may include recorded data of a first transport entity such as miles traveled, fuel used, total transport time, and the like. Immutable sequential listing 136 may include recorded data of a second transport entity such as miles traveled, fuel used, total transport time, and the like. Immutable sequential listing 136 may include recorded data showing a second transport entity operated above a cost threshold, with extra costs attributed to long idling, route deviance, long transport times, and the like. Computing device 104 may compare recorded data of a first transport entity and a second transport entity in immutable sequential listing 136 to track performances of transport entities.

Still referring to FIG. 1, computing device 104 may utilize immutable sequential listing 136 to reduce potential transport errors of a transport. Computing device 104 may store transport data 112 in immutable sequential listing 136. Immutable sequential listing 136 may include a time stamped record of one or more actions of one or more transport entities. As a non-limiting example, immutable sequential listing 136 may include a time stamped record of a first transport entity handing off a transport component to a second transport entity on Nov. 29, 2021 at 1:32 P.M. EST at 439 Sunny Brook Rd, Heidrick, Kentucky (KY), 40949.

In some embodiments, computing device 104 may analyze immutable sequential listing 136 and determine, as a function of the immutable sequential listing, a corrective action for a transport entity 108. In some embodiments, computing device 104 may use a machine-learning model that may be trained with data from immutable sequential listing 136. A machine-learning model may output corrective actions as a function of one or more immutable sequential listings. Machine-learning models are discussed later in this disclosure.

Still referring to FIG. 1, computing device 104 may utilize immutable sequential listing 136 to improve communication between one or more transport entities 108. Immutable sequential listing 136 may include historical and/or present data of transport data 112. Computing device 104 may communicate data stored in immutable sequential listing 136 with one or more transport entities 108. Communication of transport data 112 recorded in immutable sequential listing 136 between two or more transport entities 108 may allow for improved compliance to a transport plan. As a non-limiting example, immutable sequential listing 136 may include recorded actions of a first transport entity. Recorded actions of a first transport entity may include an initial preparation of a transport component for a transport. Immutable sequential listing 136 may include a time stamp of one or more actions of a first transport entity, such as transport component pickup, transport component location, transport component attributes, and the like. Computing device 104 may record each action of a first transport entity sequentially in immutable sequential listing 136. Computing device 104 may communicate recorded actions of a first transport entity recorded in immutable sequential listing 136 to a second transport entity. A second transport entity may view data stored in immutable sequential listing 136 and prepare for a transport of a transport component based on one or more recorded actions of a first transport entity.

Still referring to FIG. 1, computing device 104 may be configured to compare transport data 112 that may be recorded in immutable sequential listing 136 to transport parameter threshold 116. Computing device 104 may compare a verified first data block and/or a verified second data block of immutable sequential listing 136 to a transport parameter threshold. A "transport parameter threshold" as used in this disclosure is one or more values that must be reached to produce a result. Transport parameter threshold 116 may include one or more values constraining a transport parameter. A "transport parameter" as used in this disclosure is any requirement of a transport. A transport parameter may include, but is not limited to, transport times, transport costs, transport paths, transport component quantities, and the like. In some embodiments, transport parameter threshold 116 may be received from user input on computing device 104. In other embodiments, transport parameter threshold 116 may be generated by computing device 104. Computing device 104 may generate transport parameter threshold 116 using a transport parameter machine learning model. A transport parameter machine learning model may be trained with training data correlating transport data to transport parameter thresholds. Training data may be received from, but is not limited to, an external computing device, user input, and/or previous iterations of processing. A transport parameter machine learning model may be configured to input transport data and output transport parameter thresholds. Computing device 104 may be configured to compare transport data 112 to transport parameter threshold 116 to determine a transport status of transport entity 108. A "transport status" as used in this disclosure is any categorization of a transport and/or transport entity. A transport status may include, but is not limited to, "aligned", "deviant", "correcting", "in process", "completed", and the like. A transport status of "aligned" may include a transport entity following transport procedures. A transport status of "deviant" may include a transport entity that may be misaligned with transport procedures. A transport status of "correcting" may include a transport entity that may be taking corrective action to realign themselves with transport procedures. A transport status of "in process" may include a transport entity that may be preparing for a transport. A transport status of "completed" may include a transport entity that may have completed a transport. In some embodiments, transport parameter threshold 116 may specify, but is not limited to specifying, transport times, transport costs, transport paths, and the like. As a non-limiting example, transport parameter threshold 116 may include a threshold of 6 hours for a transport. If a transport entity takes longer than 6 hours, the transport entity may be marked by computing device 104 as "deviant". Computing device 104 may compare a verified first data block and/or a verified second data block of immutable sequential listing 136 to transport parameter threshold 116 by generating an objective function.

Still referring to FIG. 1, computing device 104 may generate error mapping 120. Error mapping 120 may include linking transport data of specific transport entities to points of deviance of a transport in a transport database. Error mapping 120 may be generated as a function of a comparison of transport data 112 of immutable sequential listing 136 to transport parameter threshold 116. In some embodiments, computing device 104 may generate error mapping 120 as a search index. A "search index" as used in this disclosure is a data structure that is configured to compare and/or match data. Error mapping 120 may link one or more actions, transport status, transport data, and the like to one or more transport entities. As a non-limiting example, a first transport entity may have deviated from a transport route, which may have caused a transport to take a longer time to completed. Error mapping 120 may link the deviation of first transport entity to the transport time increase.

Still referring to FIG. 1, computing device 104 may be configured to generate transport deviance mitigation plan 124. A "transport mitigation deviance plan" as used in this disclosure is any step or steps that reduce deviance from a transport. Transport deviance mitigation plan 124 may include procedures for transport entity 108 to take to realign with a transport procedure. Transport deviance mitigation plan 124 may include a transport path adjustment. A transport path adjustment may include rerouting transport entity 108 towards a destination. In some embodiments, transport deviance mitigation plan 124 may include transport handoff adjustments. Transport handoff adjustments may include updating which transport entities meet to handoff a transport component, a location of a handoff, which transport components may be transferred, and the like. In some embodiments, transport deviance mitigation plan 124 may include a selection of which transport entities may be used in a transport. A selection may be based off historical performance of transport entities. In some embodiments, a selection of transport entities may be generated as a function of an optimization model.

Still referring to FIG. 1, an optimization model may include an optimization criterion. An "optimization criterion" as used in this disclosure is a value that is sought to be maximized or minimized in a process. An optimization criterion may include any description of a desired value or range of values for one or more attributes of a transport entity selection; desired value or range of values may include a maximal or minimal value, a range between maximal or minimal values, or an instruction to maximize or minimize an attribute. As a non-limiting example, an optimization criterion may specify that a transport entity should complete a transport as quickly as possible, for instance by minimizing the transport time; an optimization criterion may limit a transport time, for instance specifying that it must be completed before a certain date or time, or within a certain period of time. An optimization criterion may alternatively request that transport time be greater than a certain value. An optimization criterion may specify one or more tolerances for precision in transport. An optimization criterion may specify one or more desired cost attributes for the transport. In an embodiment, at least an optimization criterion may assign weights to different attributes or values associated with attributes; weights, as used herein, may be multipliers or other scalar numbers reflecting a relative importance of a particular attribute or value. One or more weights may be expressions of value to a supplier of a particular outcome, attribute value, or other facet of a transportation process; value may be expressed, as a non-limiting example, in remunerative form, such as a quantity of a medium of exchange, a monetary unit, or the like. As a non-limiting example, minimization of transport time may be multiplied by a first weight, while tolerance above a certain value may be multiplied by a second weight. Optimization criteria may be combined in weighted or unweighted combinations into a function reflecting an overall outcome desired by a user; function may be a cost function to be minimized and/or maximized. Function may be defined by reference to transport constraints and/or weighted aggregation thereof as provided by a plurality of remote computing devices; for instance, a cost function combining optimization criteria may seek to minimize or maximize a function of transportation constraints. As a non-limiting example, a cost function combining optimization criteria may seek to minimize transport times. As another non-limiting example, a cost function combining optimization criteria may seek to maximize transport recipient preference.

Still referring to FIG. 1, computing device 104 may use an optimization model to compare a first transport entity selection to a second transport entity selection. Generation of an optimization model may include generation of a function to score and weight factors to achieve a process score for each feasible pairing. In some embodiments, pairings may be scored in a matrix for optimization, where columns represent transports and rows represent transport entities potentially paired therewith; each cell of such a matrix may represent a score of a pairing of the corresponding transport to the corresponding transport entity. In some embodiments, assigning a predicted process that optimizes the objective function includes performing a greedy algorithm process. A "greedy algorithm" is defined as an algorithm that selects locally optimal choices, which may or may not generate a globally optimal solution. For instance, a carrier optimization model may select pairings so that scores associated therewith are the best score for each transport and/or for each transport entity selection. In such an example, optimization may determine the combination of transport entities such that each transport pairing includes the highest score possible.

Still referring to FIG. 1, an optimization model may be formulated as a linear objective function. An optimization model may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all transports r, S is a set of all transport entities s, $c_{rs}$ is a score of a pairing of a given transport with a given transport entity, and $x_{rs}$ is 1 if a transport r is paired with a transport entity s, and 0 otherwise. Continuing the example, constraints may specify that each transport is assigned to only one transport entity, and each transport entity is assigned only one transport. Transports may include transports as described above. Sets of transport may be optimized for a maximum score combination of all generated transport entity selections. In various embodiments, an optimization model may determine a combination of transports that maximizes a total score subject to a constraint that all transports are paired to exactly one transport entity selection. Not all transport entity selections may receive a transport pairing since each transport entity may only perform one transport. A mathematical solver may be implemented to solve for the set of feasible pairings that maximizes the sum of scores across all pairings; mathematical solver may be implemented on computing device 104 and/or another device in system 100, and/or may be implemented on third-party solver.

With continued reference to FIG. 1, an optimization model may include minimizing a loss function, where a "loss function" is an expression an output of which an optimization model minimizes to generate an optimal result. As a non-limiting example, carrier optimization model may assign variables relating to a set of parameters, which may correspond to score transports as described above, calculate an output of mathematical expression using the variables, and select a pairing that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs. Objectives represented in an objective function and/or loss function may include minimization of transportation times. Objectives may include minimization of costs of transporting a transport component. Objectives may include minimization of transport entities and/or resources used. Objectives may include minimization of a deviance of a transport. Objectives may include minimization of transport entity cost.

Still referring to FIG. 1, computing device 104 may be configured to select one or more transport entities 108 for a transport based on an optimization model as described above. Computing device 104 may select one or more entities to reduce deviance of a transport. As a non-limiting example, a first transport entity may have a history of deviating from a transport handoff, whereas a second transport entity may have a history of completing transport handoffs without deviation. Continuing this example, computing device 104 may choose the second transport entity for a transport that has one or more transport handoffs. Computing device 104 may display transport statuses of one or more transport entities to user 128. In some embodiments, computing device 104 may display transport deviance mitigation plan 124 to user 128. Displaying transport data and/or transport plans may be as described below with reference to FIG. 3.

Figure 2:
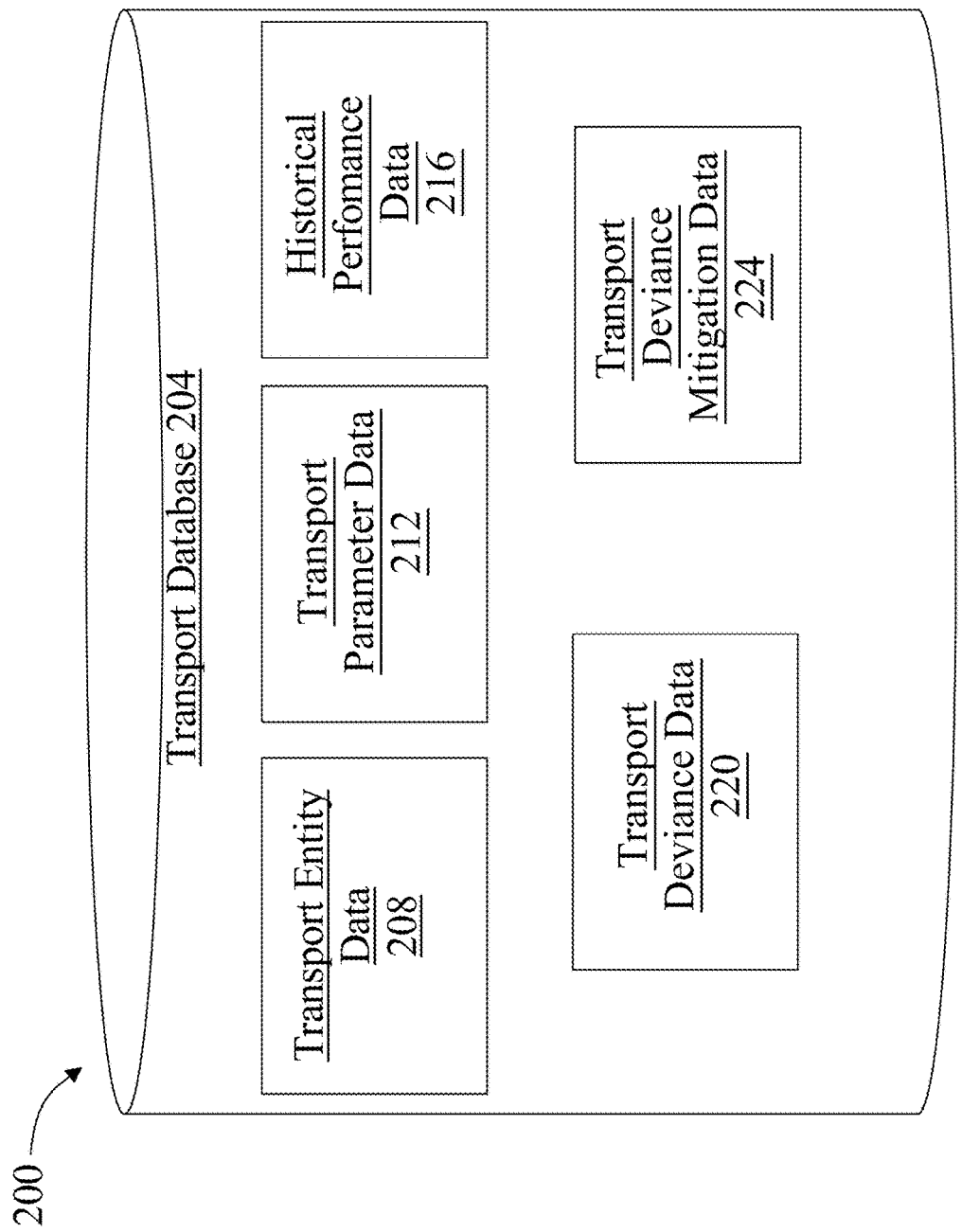
FIG. 2 illustrates an exemplary embodiment of a transport database.

Now referring to FIG. 2, system 200 for data management is shown. System 200 may include transport database 204. Transport database 204 may be implemented, without limitation, as a relational database, a key-value retrieval database such as a NOSQL database, or any other format or structure for use as a database that a person skilled in the art would recognize as suitable upon review of the entirety of this disclosure. Transport database 204 may alternatively or additionally be implemented using a distributed data storage protocol and/or data structure, such as a distributed hash table or the like. Transport database 204 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 2, transport database 204 may include transport entity data 208. Transport entity data 208 may include an identification of a transport entity. An identification of a transport entity may include a unique identification signal as described above. In some embodiments, transport entity data 208 may include transport entity types, such as, but not limited to, air, ground, sea, and the like. In some embodiments, transport entity data 208 may include data of a transport vehicle of a transport entity. Data of a transport vehicle of a transport entity may include, but is not limited to, vehicle type such as plane, car, truck, helicopter, ship, boat, drone, motorcycle, and the like. Data of a transport vehicle may include fuel amounts, location of a transport vehicle, and the like.

Still referring to FIG. 2, transport database 204 may include transport parameter data 212. Transport parameter data 212 may include data of one or more parameters of a transport. Parameters may include, but are not limited to, transport destinations, transport times, transport costs, transport component quantity, transport paths, and the like. Transport parameter data 212 may include a history of transport parameters. In some embodiments, transport parameter data 212 may include historical transport parameters corresponding to specific transports.

Still referring to FIG. 2, transport database 204 may include historical performance data 216. Historical performance data 216 may include one or more performances of one or more transport entities. A "performance" as used in this disclosure is an efficiency and/or accuracy of an action in relation to a goal. Historical performance data 216 may include previous performances of one or more transport entities. Historical performance data 216 may include performances of specific transport entities with specific transports. As a non-limiting example, historical performance data 216 may include data showing a transport entity deviated from a transport path for 12 minutes during a transport of furniture from Texas to Ohio. Historical performance data 216 may include a score of 89% of the transport entity for this particular transport.

Still referring to FIG. 2, transport database 204 may include transport deviance data 220. Transport deviance data 220 may include one or more parameters that may be considered as a deviation. Transport deviance data 220 may include parameters such as, but not limited to, wrong transport path, wrong transport component, wrong transport destination, missed transport handoff, and the like.

Still referring to FIG. 2, transport database 204 may include transport deviance mitigation data 224. Transport deviance mitigation data 224 may include data of one or more corrective actions that may reduce transport deviance. Transport deviance mitigation data 224 may include, but is not limited to, transport path rerouting, transport handoff adjustments, and the like. Transport deviance mitigation data 224 may include one or more corrective actions for a deviance action. As a non-limiting example, transport deviance mitigation data 224 may include a deviant action of stopping for too many food stops. Transport deviance mitigation data 224 may link an action of transport path rerouting, reducing a number of stops in a transport, selecting food stops more closely aligned with a transport path, and the like.

Figure 3:
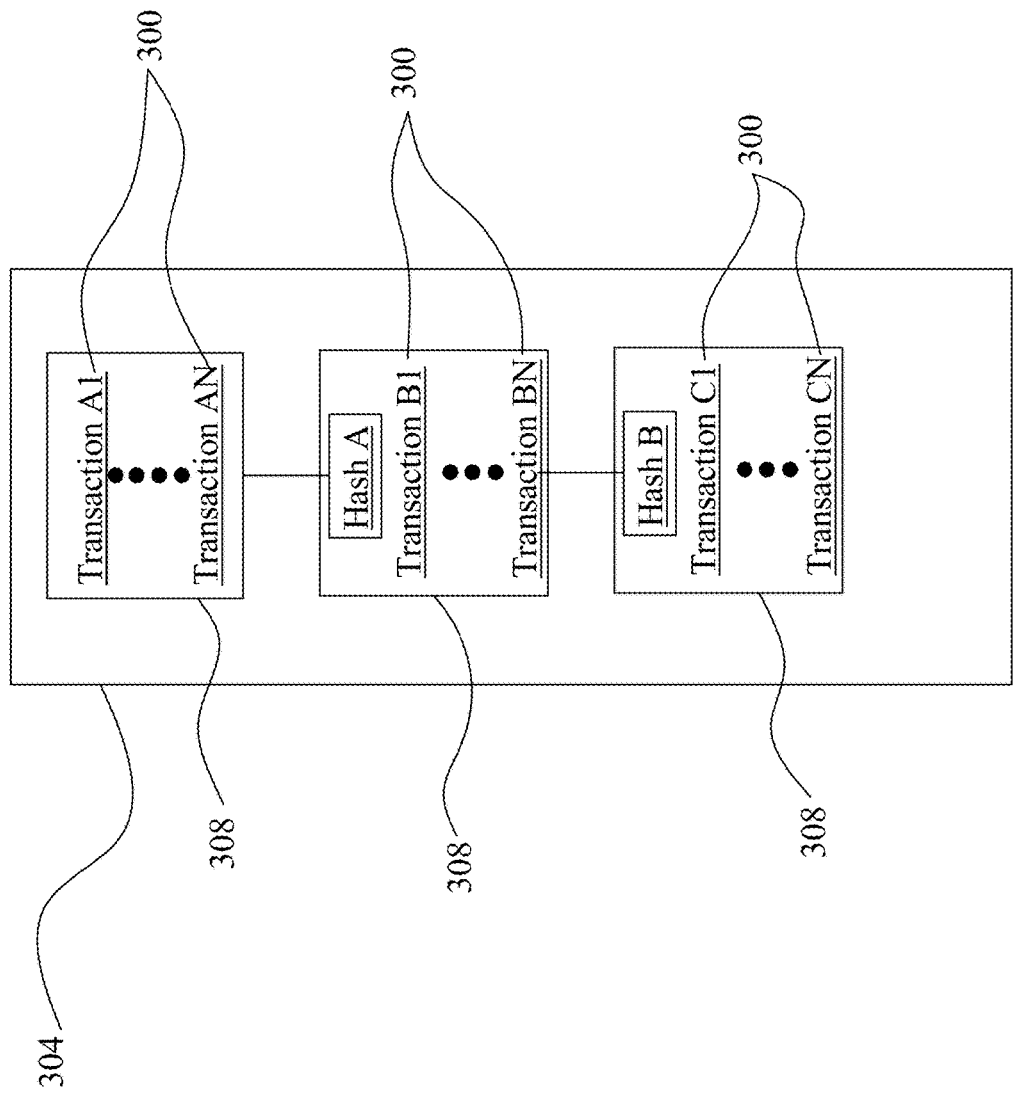
FIG. 3 is a representative screenshot depicting various aspects of an exemplary transport deviance mitigation interface implemented in accordance with aspects of the invention.

Referring now to FIG. 3, an exemplary embodiment of an immutable sequential listing 300 is illustrated. Data elements are listing in immutable sequential listing 300; data elements may include any form of data, including textual data, image data, encrypted data, cryptographically hashed data, and the like. Data elements may include, without limitation, one or more at least a digitally signed assertions. In one embodiment, a digitally signed assertion 304 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 504. In an embodiment, collection of textual data states that the owner of a certain transferable item represented in a digitally signed assertion 304 register is transferring that item to the owner of an address. A digitally signed assertion 304 may be signed by a digital signature created using the private key associated with the owner's public key, as described above.

Still referring to FIG. 3, a digitally signed assertion 304 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 304 may describe the transfer of a physical good; for instance, a digitally signed assertion 304 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 304 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 3, in one embodiment, an address is a textual datum identifying the recipient of virtual currency or another item of value in a digitally signed assertion 304. In some embodiments, address is linked to a public key, the corresponding private key of which is owned by the recipient of a digitally signed assertion 304. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 304 may record a subsequent a digitally signed assertion 304 transferring some or all of the value transferred in the first a digitally signed assertion 304 to a new address in the same manner. A digitally signed assertion 304 may contain textual information that is not a transfer of some item of value in addition to, or as an alternative to, such a transfer. For instance, as described in further detail below, a digitally signed assertion 304 may indicate a confidence level associated with a distributed storage node as described in further detail below.

In an embodiment, and still referring to FIG. 3 immutable sequential listing 300 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 300 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 3, immutable sequential listing 300 may preserve the order in which the at least a posted content took place by listing them in chronological order; alternatively or additionally, immutable sequential listing 300 may organize digitally signed assertions 304 into sub-listings 308 such as "blocks" in a blockchain, which may be themselves collected in a temporally sequential order; digitally signed assertions 304 within a sub-listing 308 may or may not be temporally sequential. The ledger may preserve the order in which at least a posted content took place by listing them in sub-listings 308 and placing the sub-listings 308 in chronological order. The immutable sequential listing 300 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 300 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 3, immutable sequential listing 300, once formed, may be inalterable by any party, no matter what access rights that party possesses. For instance, immutable sequential listing 300 may include a hash chain, in which data is added during a successive hashing process to ensure non-repudiation. Immutable sequential listing 300 may include a block chain. In one embodiment, a block chain is immutable sequential listing 300 that records one or more new at least a posted content in a data item known as a sub-listing 308 or "block." An example of a block chain is the BITCOIN block chain used to record BITCOIN transactions and values. Sub-listings 308 may be created in a way that places the sub-listings 308 in chronological order and link each sub-listing 308 to a previous sub-listing 308 in the chronological order so that any computing device may traverse the sub-listings 308 in reverse chronological order to verify any at least a posted content listed in the block chain. Each new sub-listing 308 may be required to contain a cryptographic hash describing the previous sub-listing 308. In some embodiments, the block chain contains a single first sub-listing 308 sometimes known as a "genesis block."

Still referring to FIG. 3, the creation of a new sub-listing 308 may be computationally expensive; for instance, the creation of a new sub-listing 308 may be designed by a "proof of work" protocol accepted by all participants in forming the immutable sequential listing 300 to take a powerful set of computing devices a certain period of time to produce. Where one sub-listing 308 takes less time for a given set of computing devices to produce the sub-listing 308 protocol may adjust the algorithm to produce the next sub-listing 308 so that it will require more steps; where one sub-listing 308 takes more time for a given set of computing devices to produce the sub-listing 308 protocol may adjust the algorithm to produce the next sub-listing 308 so that it will require fewer steps. As an example, protocol may require a new sub-listing 308 to contain a cryptographic hash describing its contents; the cryptographic hash may be required to satisfy a mathematical condition, achieved by having the sub-listing 308 contain a number, called a nonce, whose value is determined after the fact by the discovery of the hash that satisfies the mathematical condition. Continuing the example, the protocol may be able to adjust the mathematical condition so that the discovery of the hash describing a sub-listing 308 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 308 according to the protocol is known as "mining." The creation of a new sub-listing 308 may be designed by a "proof of stake" protocol as will be apparent to those skilled in the art upon reviewing the entirety of this disclosure.

Continuing to refer to FIG. 3, in some embodiments, protocol also creates an incentive to mine new sub-listings 308. The incentive may be financial; for instance, successfully mining a new sub-listing 308 may result in the person or entity that mines the sub-listing 308 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 308 Each sub-listing 308 created in immutable sequential listing 300 may contain a record or at least a posted content describing one or more addresses that receive an incentive, such as virtual currency, as the result of successfully mining the sub-listing 308.

With continued reference to FIG. 3, where two entities simultaneously create new sub-listings 308, immutable sequential listing 300 may develop a fork; protocol may determine which of the two alternate branches in the fork is the valid new portion of the immutable sequential listing 300 by evaluating, after a certain amount of time has passed, which branch is longer. "Length" may be measured according to the number of sub-listings 308 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 308 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 300 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 300.

Still referring to FIG. 3, additional data linked to at least a posted content may be incorporated in sub-listings 308 in the immutable sequential listing 300; for instance, data may be incorporated in one or more fields recognized by block chain protocols that permit a person or computer forming a at least a posted content to insert additional data in the immutable sequential listing 300. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 3, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 308 in a block chain computationally challenging; the incentive for producing sub-listings 308 may include the grant of new crypto-currency to the miners. Quantities of crypto-currency may be exchanged using at least a posted content as described above.

Figure 4:
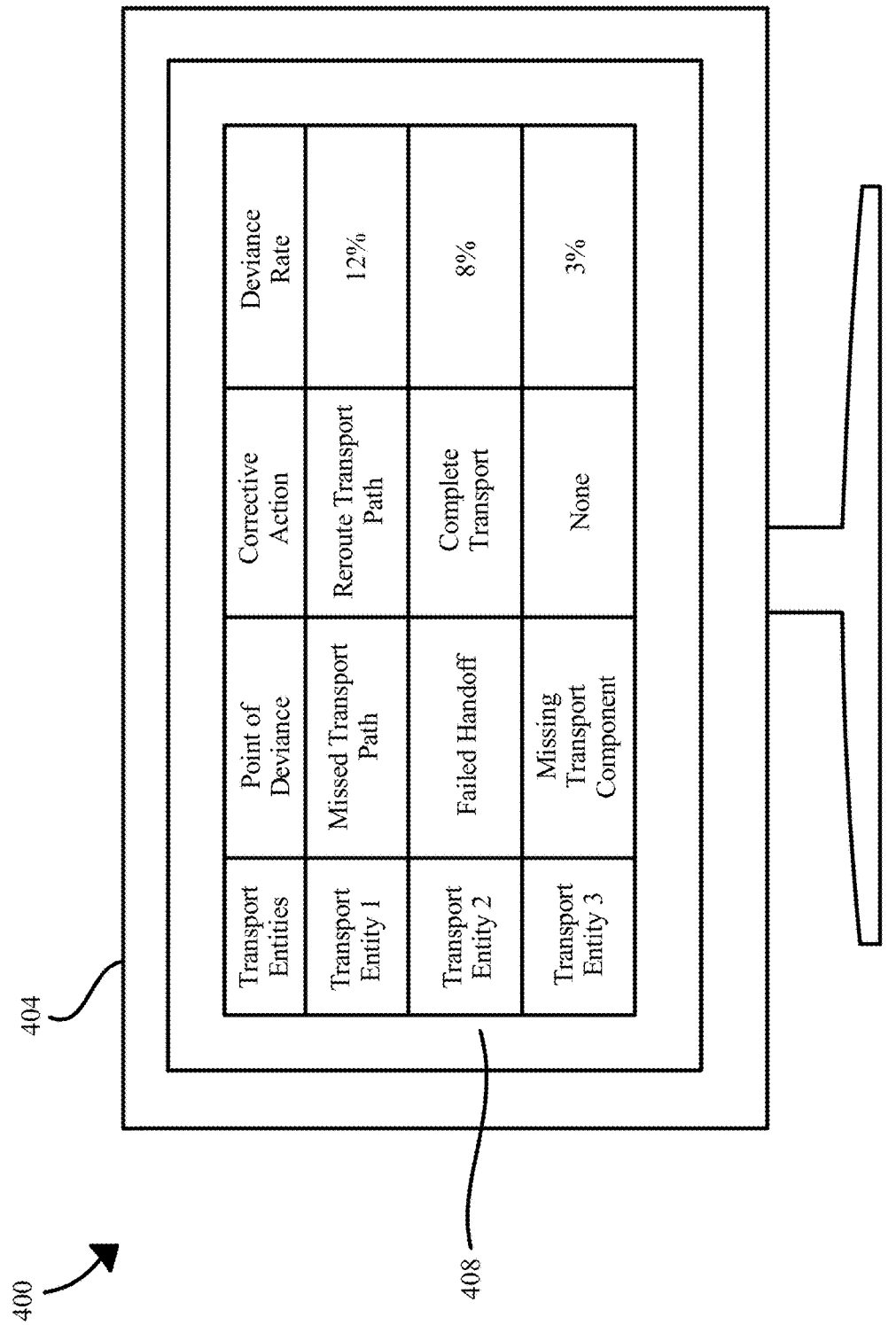
FIG. 4 is a block diagram of a machine learning model.

Now referring to FIG. 4, an exemplary embodiment of a system for displaying transport data 400 is shown. Transport data 400 may include display device 404. Display device 404 may include, but is not limited to, a smartphone, tablet, laptop, monitor, tablet, and the like. Display device 404 may include a graphical user interface (GUI). In some embodiments, computing device 104 may be configured to display transport data table 408 on display device 404. Transport data table 408 may include data of one or more transport entities. Transport data table 408 may be configured to show one or more transport entities for a given transport. In other embodiments, transport data table 408 may be configured to show overall transport data of one or more entities. In some embodiments, transport data table 408 may be configured to display a color code. A "color code" as used in this disclosure is any color that displays corresponding information. In some embodiments, transport data table 408 may be configured to display error mapping 120. In some embodiments, transport data table 408 may be configured to display transport deviance mitigation plan 124.

Figure 5:
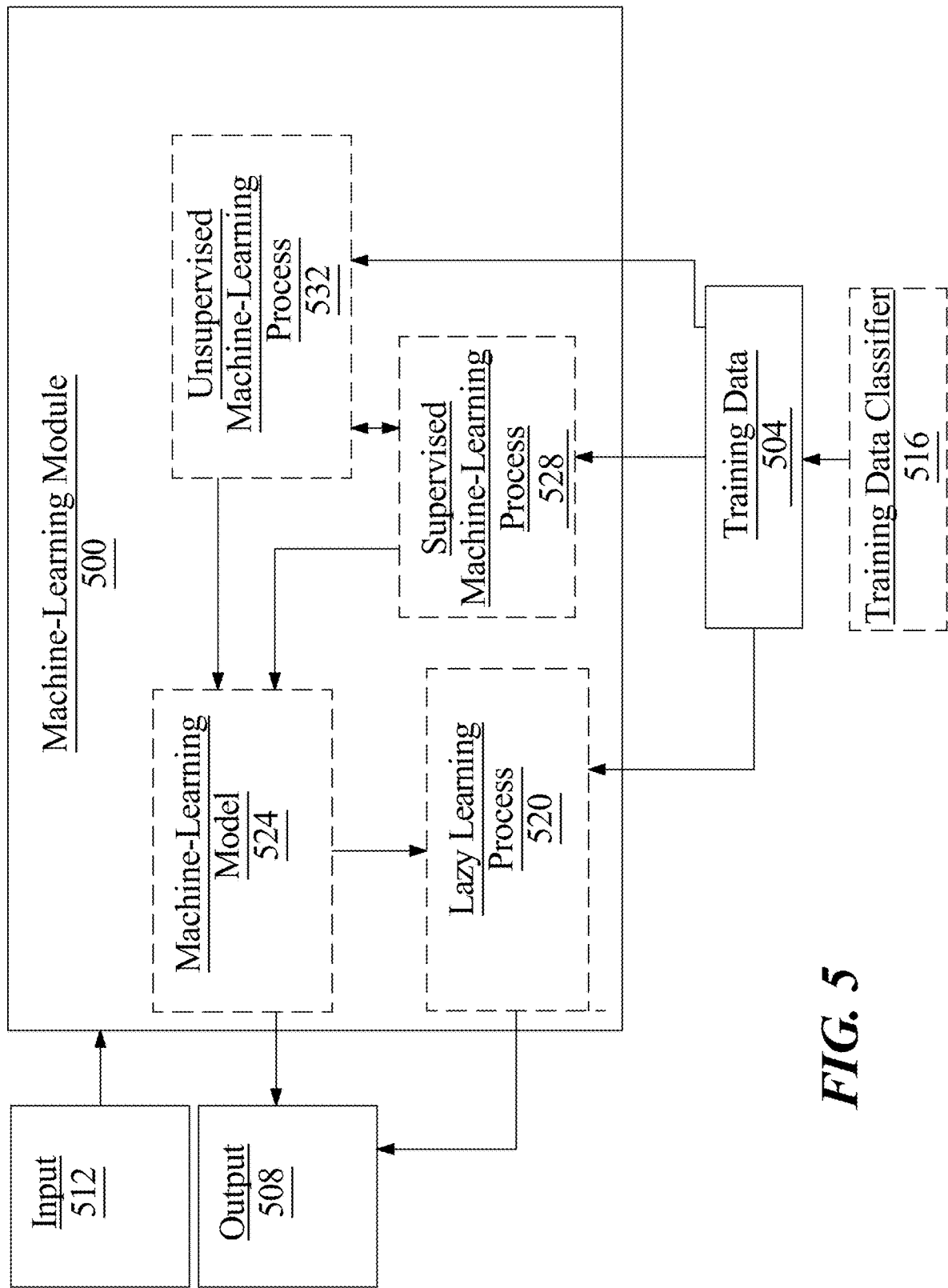
FIG. 5 is a flow diagram for a method of transport deviance mitigation.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. Training data may be received from user input, remote computing devices, and/or previous iterations of processing. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example inputs may include transport data and outputs may include transport deviance mitigation plans.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to transport parameters, transport destinations, transport entity performance, and the like.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include transport data as described above as inputs, transport deviance mitigation plans as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
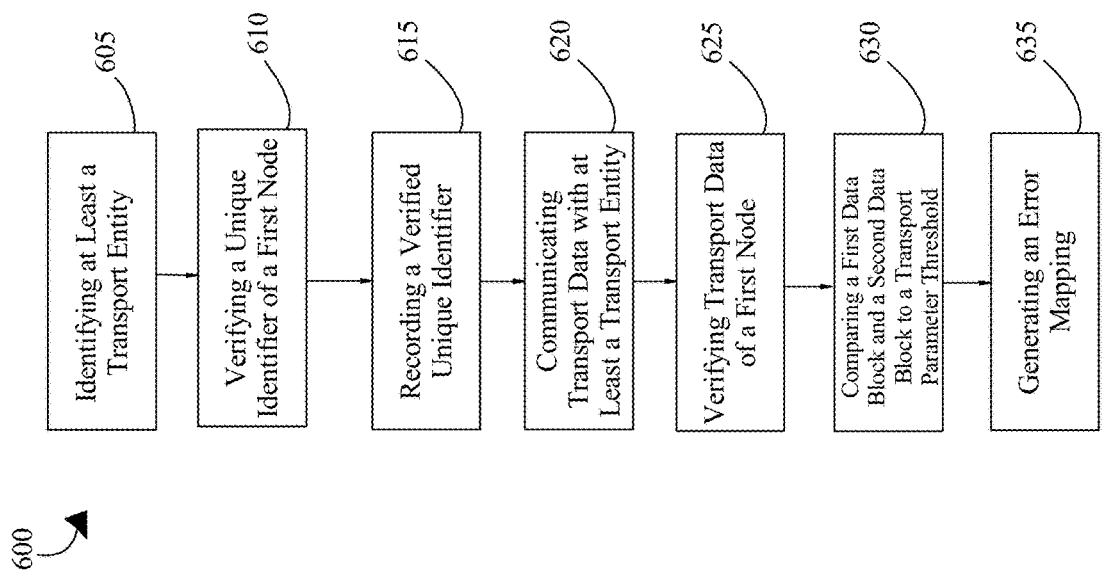
FIG. 6 is a block diagram of an exemplary embodiment of an immutable sequential listing.

Now referring to FIG. 6, a method of tracing a transport is presented. At step 605, method 600 includes identifying at least a transport entity. A transport entity may be identified from a plurality of transport entities of a transport. Identifying may include receiving a unique identifier of a first node of an immutable sequential listing. This step may be implemented as described above, without limitation, in FIGS. 1-5.

Still referring to FIG. 6, at step 610, method 600 includes verifying a unique identifier of a first node. Verification may include comparing a unique identifier to a verification criteria of an immutable sequential listing. This step may be implemented, without limitations, as described above in FIGS. 1-5.

Still referring to FIG. 6, at step 615, method 600 includes communicating transport data with at least a transport entity. Transport data may be as described above. In some embodiments, communicating may take place over a Wi-Fi, cellular, radio, and/or other wireless connection. This step may be implemented, without limitations, as described above in FIGS. 1-5.

Still referring to FIG. 6, at step 620, method 600 includes verifying transport data of a first node. Verification may include comparing transport data of a first node to verification criteria of an immutable sequential listing. This step may be implemented, without limitations, as described above in FIGS. 1-5.

Still referring to FIG. 6, at step 625, method 600 includes recording at least a transport datum in an immutable sequential listing. At least a transport datum may include data of transport data communicated with at least a transport entity. At least a transport datum may include, but is not limited to, actions, time stamps, costs, and the like. This step may be implemented as described above in FIGS. 1-5.

Still referring to FIG. 6, at step 630, method 600 includes comparing a first data block and a second data block to a transport parameter threshold. A comparison may include generating an objective function as described above. In some embodiments, a parameter threshold may dictate a deviance of a transport entity from a transport plan. This step may be implemented, without limitations, as described above in FIGS. 1-5.

Still referring to FIG. 6, at step 635, method 600 includes generating an error mapping of at least a transport entity. An error mapping may link one or more elements of transport data of a transport entity to one or more points of failure in a transport. This step may be implemented, without limitations as described above in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
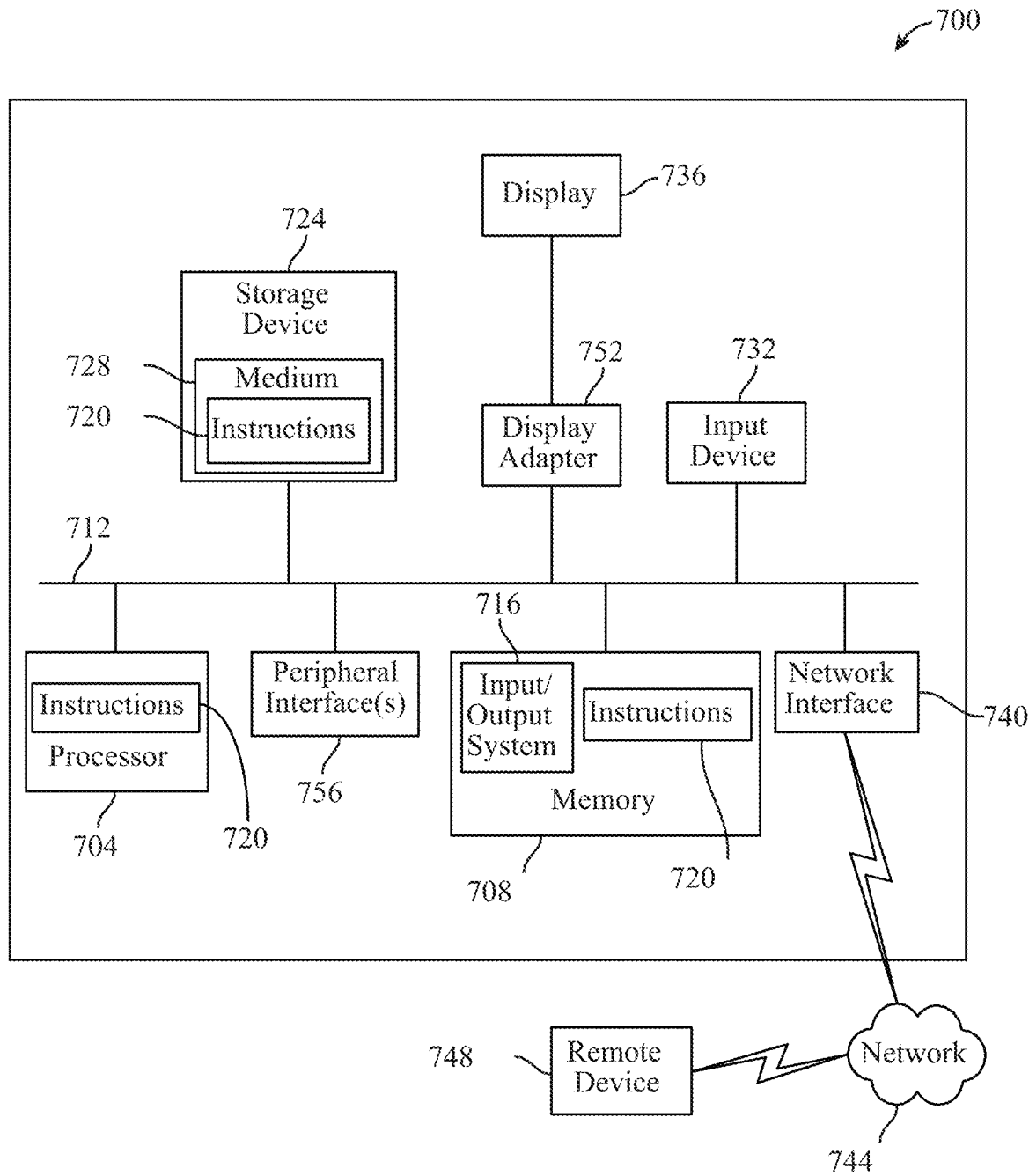
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Still referring to FIG. 7, processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Still referring to FIG. 7, memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Still referring to FIG. 7, computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Still referring to FIG. 7, computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

Still referring to FIG. 7, a user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Still referring to FIG. 7, computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for tracing a transport, comprising:
a computing device configured to:
identify at least a transport entity of a plurality of transport entities of a transport using a unique identifier of a first node of an immutable sequential listing, wherein the unique identifier comprises at least a barcode;
verify the unique identifier of the first node as a function of a verification criteria, wherein the verification criteria comprises a digital signature of the immutable sequential listing;
record the verified unique identifier of the at least a transport entity in a first data block of the immutable sequential listing;
communicate transport data with the at least a transport entity through the first node of the immutable sequential listing;
verify the transport data of the first node as a function of the verification criteria of the immutable sequential listing;
record at least a transport datum of the verified transport data in a second data block of the immutable sequential listing;
generate, using a transport parameter machine learning model, a transport parameter threshold,
wherein the transport parameter machine learning model is trained with transport training data correlating transport data to transport parameter thresholds;
compare the first data block and the second data block of the immutable sequential listing separately to a transport parameter threshold;
generate, as a function of the comparison, an error mapping of the at least a transport entity;
determine, as a function of the transport parameter machine-learning model, a transport status of at least a transport entity, wherein the transport parameter machine learning model is configured to receive a plurality of transport data and output a transport status of a transport entity, and the transport parameter machine-learning model is further configured to output corrective actions as a function of data of the immutable sequential listing, and wherein determining the transport status comprises:
receiving training data, wherein the training data correlates a plurality of transport data to a transport status; and
training the machine learning model as a function of the training data;
update the plurality of transport data in real-time; and
retrain the machine learning model as a function of the updated training data correlating a plurality of transport data to the transport status:
select at least one transport entity of the plurality of transport entities to be used in a transport,
wherein selecting at least one transport entity comprises:
comparing a first transport entity to a second transport entity using an optimization model;
generating a process score for a matrix of transports and the plurality of transport entities as a function of the comparison; and
pairing, as a function of the optimization model, a transport and transport entity with a highest process score; and
determine a transport deviance mitigation plan as a function of the transport status and the error mapping, wherein the transport deviance mitigation plan comprises one or more transport handoff adjustments configured to update at least one handoff location, and wherein the transport deviance mitigation plan further comprises selecting at least one transport entity of the plurality of transport entities to be used in a transport.

2. The system of claim 1, wherein the verification criteria includes a chronological element.

3. The system of claim 1, wherein generating the error mapping includes generating a search index of a transport database.

4. The system of claim 1, wherein comparing the first data block and the second data block to a transport parameter threshold includes generating an objective function.

5. The system of claim 1, wherein the computing device is further configured to display an error table on a user device.

6. The system of claim 1, wherein comparing the first data block and the second data block of the immutable sequential listing includes comparing historical performance of the at least a transport entity to a transport parameter threshold.

7. The system of claim 1, wherein the computing device is further configured to communicate the transport deviance mitigation plan to a transport entity of the transport.

8. The system of claim 1, wherein the error mapping of the at least a transport entity allocates a transport status to a transport entity.

9. The system of claim 1, wherein the at least a barcode comprises a quick response (QR) code.

10. A method of tracing a transport using a computing device, comprising:
- identifying, using a computing device, at least a transport entity of a plurality of transport entities of a transport using a unique identifier of a first node of an immutable sequential listing,
  - wherein the unique identifier comprises at least a barcode;
- verifying, using the computing device, the unique identifier of the first node as a function of a verification criteria, wherein the verification criteria comprises a digital signature of the immutable sequential listing;
- recording, using the computing device, the verified unique identifier of the at least a transport entity in a first data block of the immutable sequential listing;
- communicating, using the computing device, transport data with the at least a transport entity through the first node of the immutable sequential listing;
- verifying, using the computing device, the transport data of the first node as a function of the verification criteria of the immutable sequential listing;
- recording, using the computing device, at least a transport datum of the verified transport data in a second data block of the immutable sequential listing;
- generating, using a transport parameter machine-learning model, a transport parameter threshold,
  - wherein the transport parameter machine-learning model is trained with transport training data correlating transport data to transport parameter thresholds;
- comparing the first data block and the second data block of the immutable sequential listing separately to a transport parameter threshold; and
- generating, as a function of the comparison, an error mapping of the at least a transport entity;
- determining, as a function of the transport parameter machine-learning model, a transport status of at least a transport entity, wherein the transport parameter machine-learning model is configured to receive a plurality of transport data and output a transport status of a transport entity, wherein the transport parameter machine-learning model is further configured to output corrective actions as a function of data of the immutable sequential listing, wherein determining the transport status comprises:
  - receiving training data, wherein the training data correlates a plurality of transport data to a transport status;
  - training the machine-learning model as a function of the training data;
  - update the plurality of transport data in real-time; and
  - retrain the machine learning model as a function of the updated training data correlating a plurality of transport data to the transport status;
- selecting at least one transport entity of the plurality of transport entities to be used in a transport,
  - wherein selecting at least one transport entity comprises:
    - comparing a first transport entity to a second transport entity using an optimization model;
    - generating a process score for a matrix of transports and the plurality of transport entities as a function of the comparison; and
    - pairing, as a function of the optimization model, a transport and transport entity with a highest process score; and
- determining, using the computing device, a transport deviance mitigation plan as a function of the transport status and the error mapping, wherein the transport deviance mitigation plan comprises one or more transport handoff adjustments configured to update at least one handoff location, and wherein the transport deviance mitigation plan further comprises selecting at least one transport entity of the plurality of transport entities to be used in a transport.

11. The method of claim 10, wherein the verification criteria includes a chronological element.

12. The method of claim 10, wherein generating an error mapping includes generating a search index of a transport database.

13. The method of claim 10, wherein comparing the first data block and the second data block to a transport parameter threshold includes generating an objective function.

14. The method of claim 10, wherein the computing device is further configured to display an error table on a user device.

15. The method of claim 10, wherein comparing the first data block and the second data block of the immutable sequential listing includes comparing historical performance of the at least a transport entity to a transport parameter threshold.

16. The method of claim 10, wherein the computing device is further configured to communicate a transport deviance mitigation plan to a transport entity of the transport.

17. The method of claim 10, wherein the error mapping of the at least a transport entity allocates a transport status to a transport entity.

18. The method of claim 10, wherein the at least a barcode comprises a quick response (QR) code.

* * * * *